April 3, 1956 — A. A. D'AUDIFFRET ET AL — 2,740,476
METHOD AND APPARATUS FOR COLLECTING WATER
Filed Nov. 5, 1952 — 3 Sheets-Sheet 1
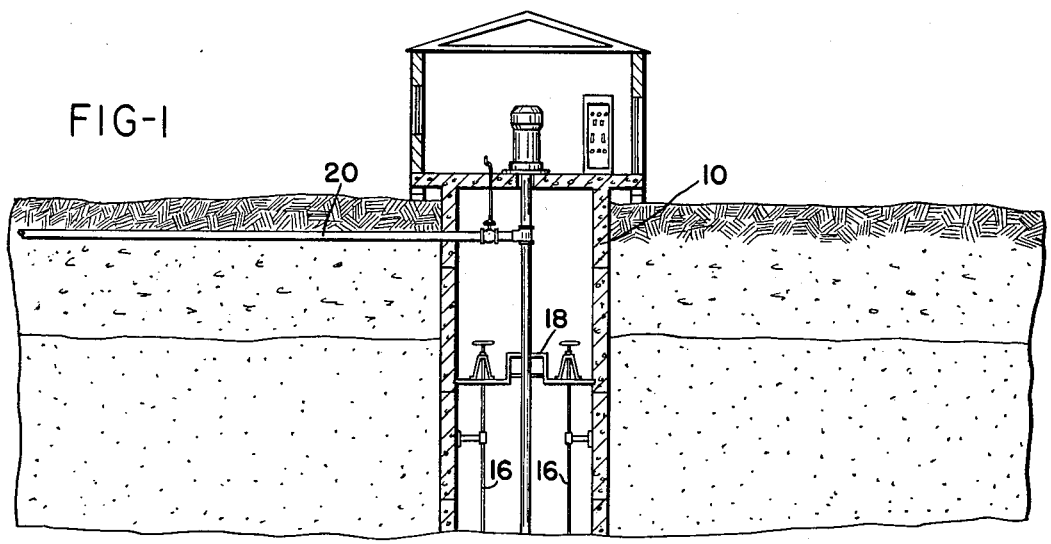
FIG-1
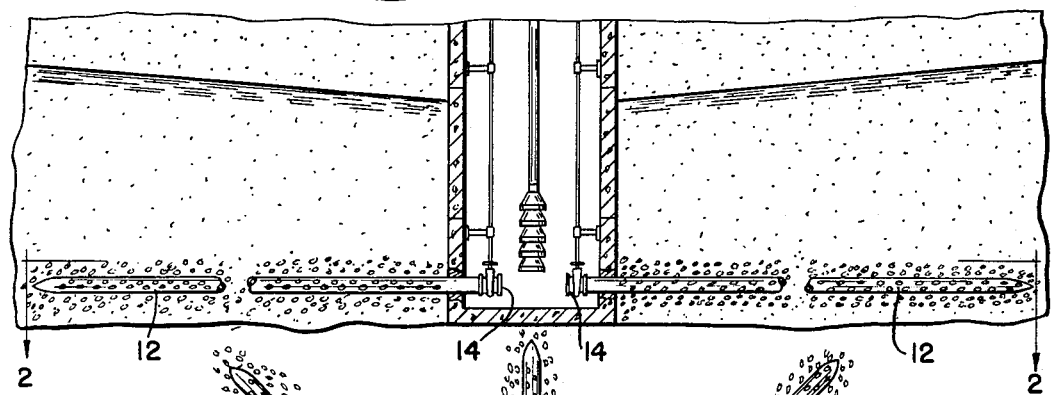
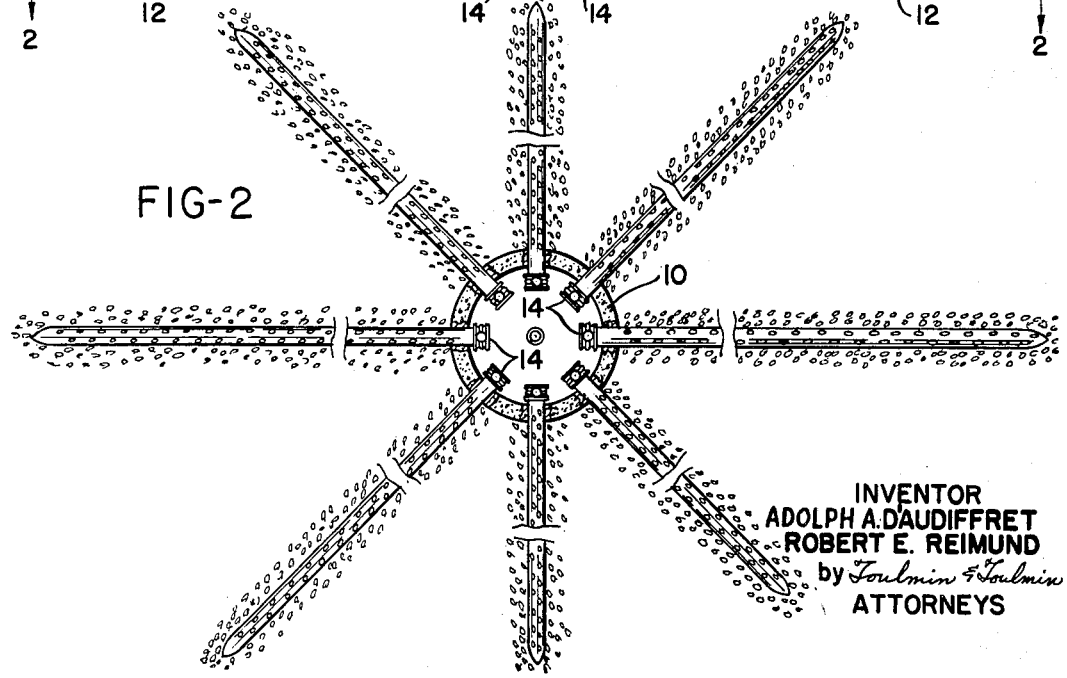
FIG-2
INVENTOR
ADOLPH A. D'AUDIFFRET
ROBERT E. REIMUND
by Toulmin & Toulmin
ATTORNEYS

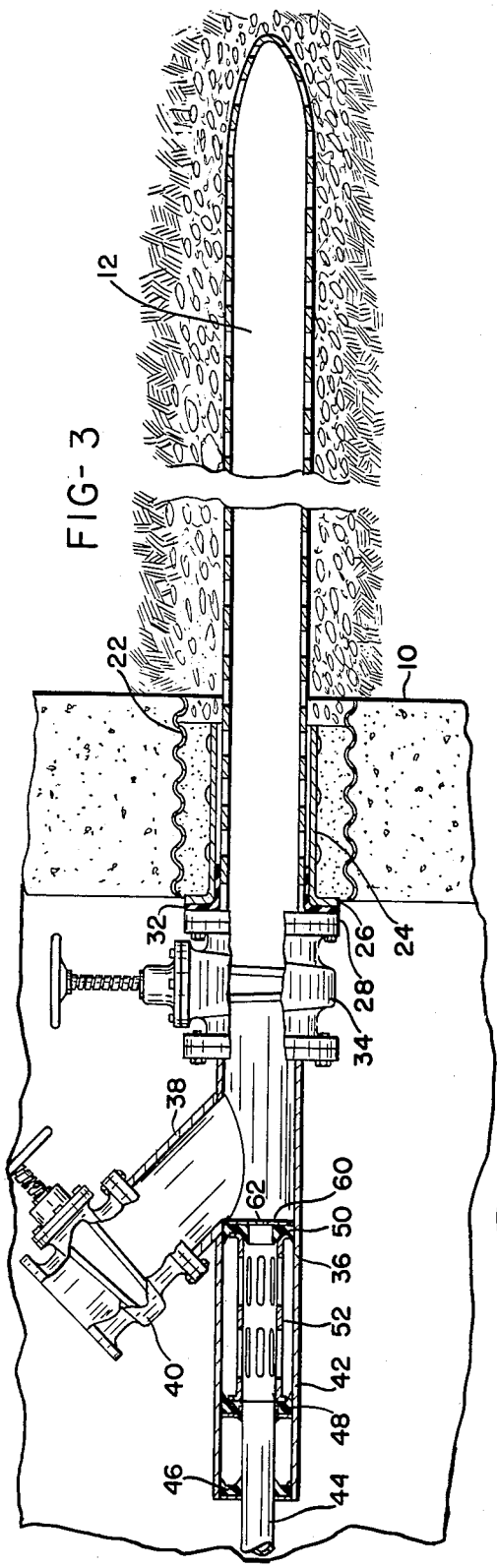
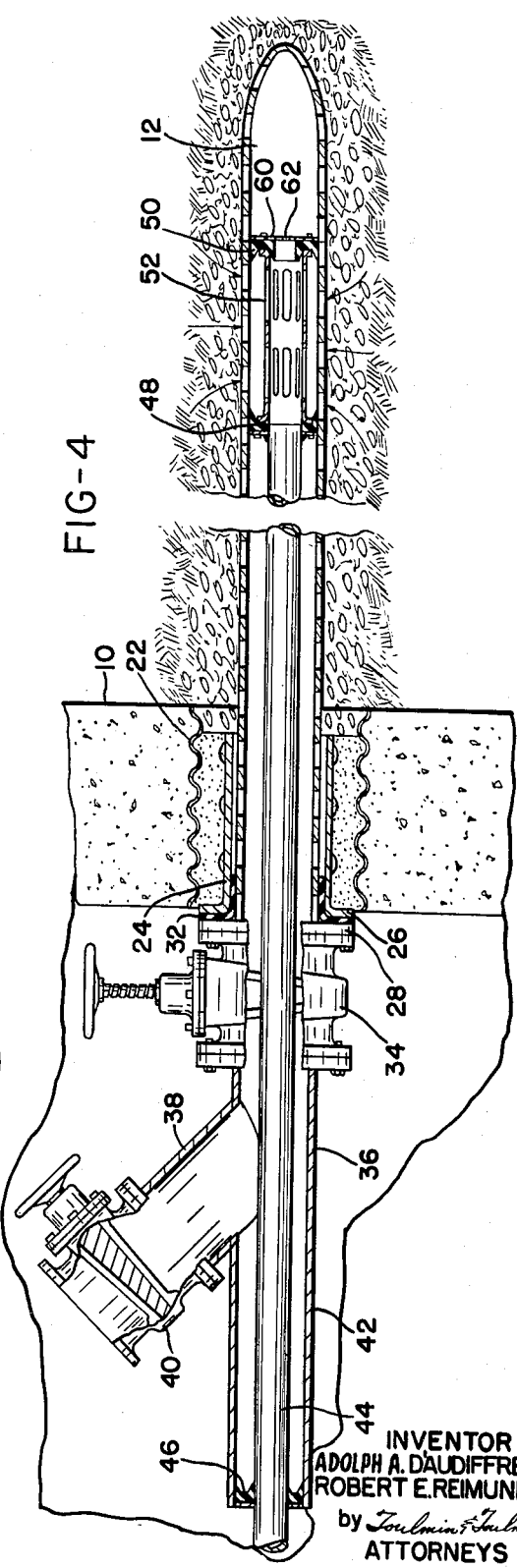

INVENTOR
ADOLPH A. D'AUDIFFRET
ROBERT E. REIMUND
by Toulmin & Toulmin
ATTORNEYS

United States Patent Office 2,740,476
Patented Apr. 3, 1956

2,740,476

METHOD AND APPARATUS FOR COLLECTING WATER

Adolph Aloys D'Audiffret and Robert E. Reimund, Columbus, Ohio, assignors to Ranney Method Water Supplies, Inc., Columbus, Ohio, a corporation of West Virginia Application November 5, 1952, Serial No. 318,922

5 Claims. (Cl. 166—46)

This invention relates to a device for collecting water and to a method of installing the device.

The present invention is concerned with a collector for collecting water from beneath the surface of the ground and is, in general, similar to the invention disclosed in the Eugene W. Silitch and Adolph d'Audiffret application for U. S. Patent, Serial No. 767,150, filed August 7, 1947, now Patent No. 2,622,683, but represents a further advance and improvement in the art thereover.

A water collector of the nature with which the present invention is concerned consists, in general, of a vertical caisson sunk into the ground until it intersects a water bearing stratum. Thereafter, perforated collector pipes or screen pipes are pushed radially outwardly through the caisson wall into the water bearing stratum at one or more levels and with as many radial pipes as may be required to collect the volume of water desired. The water flows through the screen pipes into the caisson by gravity and is then pumped from the caisson to the pipes which convey it to the point of use of the water.

In installing a collection apparatus of the nature referred to, certain problems present themselves, particularly as to the treatment of the zone immediately surrounding each collector pipe. It will be evident that these zones must be highly permeable to water flow in order to maintain a sufficient rate of flow into the respective collector pipe to produce the desired capacity for the collector, and that the water should pass into the said collector pipe substantially free of soil or sand. For this reason, it is important that each screen pipe have associated therewith a bed through which the water filters thereto which has been substantially cleared of soil and sand before the collector is placed in operation, whereby the water delivered to the caisson by the screen pipe will not be contaminated in any way.

In the pushing outwardly from the caisson of the screen pipe, a good deal of resistance is encountered due to the friction between the pipe and the earth. This resistance and friction come about partly on account of the pressure of the earth on the sides of the pipe and partly on account of the displacement of the earth at the head of the pipe which occurs as the pipe is moved outwardly. In either case, there is a tendency for the earth to be crowded up and compacted about the pipe, and this has the effect of resisting movement of the pipe outwardly. In these cases it is important to modify this condition by removing at least some of the excess earth material from about the pipe which is impeding its outward progress. This is particularly true if, for some reason, the pipe is projected through a zone of clay or the like during its travel outwardly. The operation of removing earth in this general manner is accomplished to the best degree only when it is possible to withdraw water and entrained soil or sand from selective zones along the screen pipe.

Having the foregoing in mind, it is a primary object of the present invention to provide a water collecting device and a method of installing the device which overcomes the drawbacks referred to above that have hampered operations in previous installations.

A still further object of the present invention is the provision of an improved method and device for carrying out the method in connection with the preparing of a bed or zone around a screen pipe in a water collector of the nature referred to.

A particular object of this invention is to provide a method of, and an apparatus for, the selective removal of soil and fines about a screen pipe at any selected zone therealong.

A still further object is the provision of a method of, and apparatus for, the treatment of limited selected zones along a screen pipe for the loosening up, and agitation of, the soil and fines, and the subsequent removal from the limited selected zones, of the said soil and fines thereby to prepare a zone or space around each pipe through which clean uncontaminated water will pass into the screen pipe and thence into the caisson.

The foregoing objects referred to above, as well as still other objects and advantages of this invention, will become more apparent upon reference to the following specification taken in connection with the accompanying drawings, in which:

Figure 1 is a vertical sectional view showing a typical installation of a water collector constructed according to the present invention;

Figure 2 is a plan view indicated, generally, by line 2—2 on Figure 1 showing the radial arrangement of the screen pipes of the collector;

Figure 3 shows the apparatus of this invention with a screen pipe in an intermediate outward position, and with a selective sand removal unit, according to this invention, in a retracted position;

Figure 4 is a view like Figure 3 but shows the selective sand removal unit in an advanced position for the selective treatment of the zone around a certain portion of the screen pipe;

Figure 5:
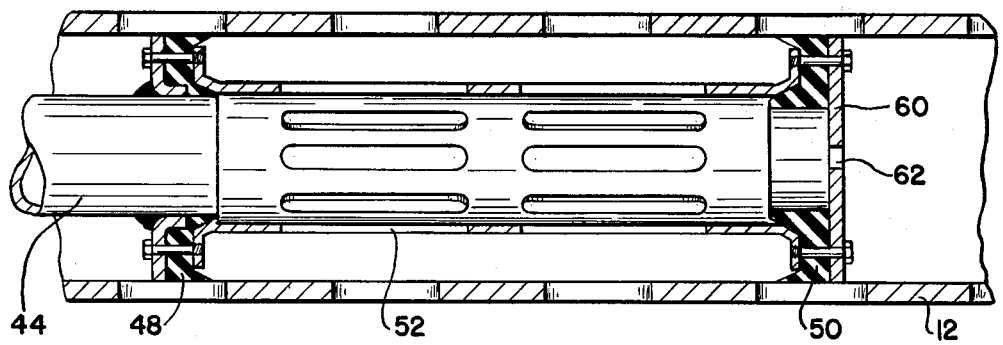
Figure 5 is an enlarged sectional view through a portion of the flushing and sand removal device.

Referring to the drawings somewhat more in detail, with particular reference to Figures 1 and 2, the water collector, according to this invention and installed according to the methods of this invention, consists of a central caisson 10 sunk vertically into the ground by pouring concrete rings one on top of the other and digging out from beneath the rings so that they will sink vertically downwardly into the ground to the desired level. The location of the caisson is initially determined by survey, and the depth to which the caisson is sunk is likewise determined at the same time.

One or more of the first poured rings of the caisson and, therefore, one or more of the rings at the bottom of the caisson when it has reached the desired depth, are provided with circumferentially spaced port holes through which the radial collector pipes are to be pushed.

According to well known practices, the port holes are plugged with boards or the like which will readily rupture when the screen pipe is pressed thereagainst with sufficient force.

The radially projecting screen pipes in Figures 1 and 2 are identified by reference numeral 12, and on the inner end of each such pipe there is a valve 14 adapted for being controlled by a rod 16 leading upwardly in the caisson to above the upper water level therein to an operating platform 18.

The water which collects in the caisson from the collector pipes can be drawn therefrom by any suitable pumping means for delivery to a supply pipe.

Wells of the nature described are extremely important for collecting water for industrial or municipal use, and a capacity of many millions of gallons of water a day is not unusual with collectors of this nature.

Due to the extremely large volume of water that will pass through the collector, it is important for the beds around the screen pipes to be clean and porous so that the water can pass into the screen pipes rapidly while, at the same time, it will not be contaminated by soil or sand.

Turning now to Figures 3 and 4, the manner in which the screen pipes are projected from a caisson, according to the present invention, is more fully illustrated in Figure 3. The port hole through which the pipe 12 is projected is indicated at 22, and extending into the caisson side of the port hole is a flanged metal sleeve 24 grouted into position, either at the time the respective ring of the caisson is poured or after the caisson is completed and prior to projecting the screen pipe.

Figure 7:
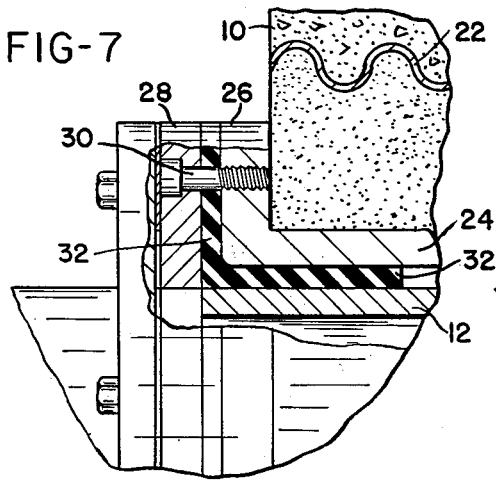
Figures 7 and 8 are fragmentary views illustrating details in construction of the collector.
Figure 8:
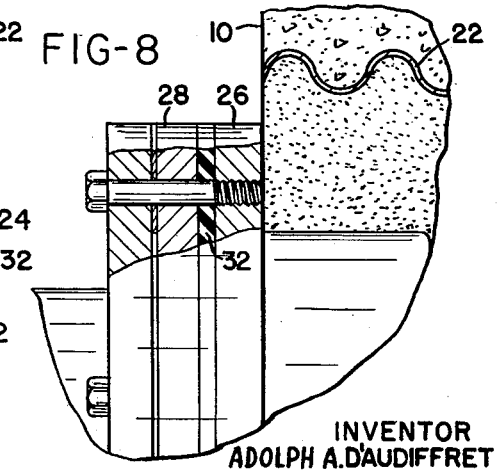

The flange 26 of member 24 is availed of for receiving a ring flange 28 which is bolted thereto by bolts 30, as will be seen in Figure 7.

Between ring flange 28 and the flange end 26 of member 24 there is a resilient rubber-like sealing sleeve 32 that extends inwardly along the axial part of member 24 and closely surrounds screen pipe 12. This prevents leakage of water into the caisson as the screen pipe is being projected therefrom.

Inside the caisson and abutting ring flange 28 is a gate valve 34 which may advantageously correspond to or be identical with gate valve 14 previously referred to, and which serves to control the screen pipe after the water collector has been completed and placed in operation.

As will be seen in Figures 3 and 4, there is bolted to the face of valve 34, opposite its connection with member 24, a Y-shaped fitting or assembly 36 which comprises an angularly directed branch 38 having therein a valve such as the gate valve 40. The Y-shaped assembly 36 also includes the branch 42 in axial alignment with the screen pipe and which is adapted for slidably receiving a sand pipe 44 that is sealed against the left end of branch 42 by resilient annular packing ring 46.

At the right end of sand pipe 44 there is provided a unit constructed according to this invention which consists of the spaced resilient packing rings 48 and 50 and an intermediate hollow perforated sleeve 52. The sand pipe 44 communicates with the inside of sleeve 52 and outwardly therethrough with the space between the packing rings 48 and 50.

The diameter of branch 36 of the Y-shaped assembly is substantially equal to the inside diameter of screen pipe 12, and it is thus readily possible to move the sand pipe and the said unit axially from its Figure 3 position to any selected position along the length of the screen pipe, one such position being illustrated in Figure 4.

The described arrangement is utilized in the following manner for preparing a bed around the screen pipe:

The screen pipe is projected outwardly through the valve 34 and the port hole in sections utilizing hydraulic rams or the like in the caisson as the motive force. The selective sand removal unit on the end of the sand pipe is, at this time, preferably located within the screen pipe in the region of the caisson wall and this serves as a seal to prevent water from flooding into the caisson while the screen pipe is being pushed outwardly. During the pushing outwardly of the screen pipe the Y-shaped assembly, more commonly referred to as the flushing assembly, is removed thus permitting the hydraulic rams or the like employed for pushing the screen pipe, to be effective over substantially the entire diameter of the caisson. As each section of the screen pipe approaches the caisson wall, a new section is welded thereto and the screen pipe is then pushed further outwardly.

Periodically it is necessary to flush out the screen pipe and this is accomplished by bolting the flushing assembly 36 in position on the left hand face of valve 34, and then retracting the sand pipe and sand removal unit connected thereto to their Figure 3 position. Valve 40 is then opened and water can freely run through the screen pipe and out branch 38 of the flushing assembly and through valve 40 into the caisson, whence it is pumped from the caisson and discharged.

If, during the projection of the screen pipe, it becomes desirable to treat the earth around any portion of its length selectively, the valve 40 may be closed and the sand pipe and the selective sand removal unit moved inwardly to the proper position, for example, the position of Figure 4. At this time, when the caisson end of the sand pipe 34 is opened, then water will flow as indicated by the arrows in Figure 4 through a selected and limited portion of the bed surrounding the screen pipe conducting soil, sand, and fines into the selective sand removal unit and along the sand pipe into the caisson.

Figure 6:
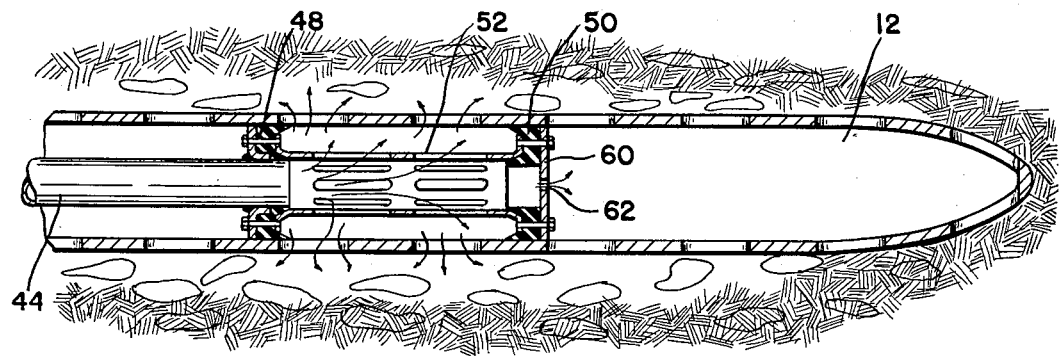
Figure 6 is a view similar to Figures 3 and 4, but shows the action which obtains when water or air under pressure is forced through the sand removal device.

Should it become necessary to agitate the ground around the screen pipe to loosen soil and sand therefrom, then the sand pipe 44 can be placed under pressure as by pumping water or air therein, and reverse flow through the sand pipe and the selective sand removal unit will take place as indicated by the arrows in Figure 6, and this will serve to dislodge the fines, sand, and soil about the screen pipe in the region of the selective sand removal unit, whereupon the releasing of pressure from the sand pipe will permit flow inwardly from about the screen pipe and through the selective sand removal unit and sand pipe into the caisson.

By shifting the sand removal unit along the screen pipe any limited selected zone can be treated, and in this manner the entire bed surrounding the screen pipe can be brought into the best possible condition for supplying clean uncontaminated water through the screen pipe to the caisson.

The final operation of treating the bed around the screen pipe takes place after the screen pipe has been projected to the desired length, and thereafter the Y-shaped flushing assembly 36, the sand pipe 44, and the selective sand removal unit are removed by retracting the sand pipe and the sand removal unit to their Figure 3 position, then closing valve 34, and unbolting and removing the flushing assembly.

In the movement outwardly in the screen pipe of the selective sand removal unit there is often some accumulation of sand or soil that might impede its progress, and for this reason the selective sand removal unit is constructed, as illustrated in Figure 5, with the right hand end plate 60 being provided with a central aperture 62 through which water will flow, taking with it sand and soil from ahead of the selective sand removal unit, thus permitting it to be positioned at any selected spot along the entire length of the screen pipe.

From the foregoing, it will be seen that what we have provided by the present invention is an improved method of installing a water collector of the nature described and an improved construction of the collector such that the screen pipes can more easily be projected, do not require any special or separable boring head, and are devoid of partitions within the pipe whereby water flow therein is unrestricted, while the bed around each collector pipe can be selectively treated in order to bring the bed into the best possible condition for delivering large volumes of uncontaminated water through the screen pipes to the caisson.

In the foregoing description a water collector has been referred to, but it is to be understood that in certain instances a substantially identical installation might be made which would be utilized, not for the purpose of withdrawing water from the ground, but for the purpose of supplying water to the ground. It will, accordingly, be understood that our use of the term "water collector" in the specification and claims of this application is intended to include devices and the installation thereof not only for the actual collection of water from the ground but for the supplying of water thereto.

By way of example as to the manner in which a water collector could be employed for supplying water to the ground, it might occur that a certain water bearing stratum was being drawn on by conventional wells or the like to the point that the water level therein was dropping to below the level at which the said wells would be effective. This condition could readily be remedied by utilizing a water collector according to this invention sunk into the water bearing stratum and with means being provided for supplying water to the caisson, as from an adjacent stream or the like, or the water so supplied to the caisson would pass outwardly to the screen pipe into the water bearing stratum and serve to maintain the level thereof at the desired point.

It will be understood that this invention is susceptible to modification in order to adapt it to different usages and conditions, and, accordingly, it is desired to comprehend such modifications within this invention as may fall within the scope of the appended claims.

We claim:

1. In combination, a caisson, a screen pipe extending radially outwardly through the caisson wall into a water bearing stratum and sealed to the caisson wall, a valve on the inner end of said pipe, and an imperforate pipe of about the same diameter as said screen pipe mounted on the face of said valve and extending into said caisson, a sand pipe extending axially into said imperforate and screen pipes and sealed to the imperforate pipe at the end thereof opposite its connection with said valve, an apertured sleeve on the end of said sand pipe, sealing means at opposite ends of said sleeve adapted for slidably sealingly engaging the inside of said screen pipe, said sleeve and seals being adapted for retraction into said imperforate pipe, and a valved branch on said imperforate pipe adapted for effecting communication between said screen pipe and caisson.

2. In combination: a caisson, a perforated screen pipe extending radially outwardly through the caisson into a water bearing stratum and said pipe being sealed to the caisson wall, a valve on the inner end of said pipe, an imperforate pipe mounted on the inner face of the valve coaxially with said screen pipe, a sand pipe coaxial with and within said imperforate and screen pipes and sealingly engaging the inner end of said imperforate pipe, means on the end of the sand pipe inside the screen pipe in fluid communication with the sand pipe and the surrounding portion of the screen pipe and slidably sealingly engaging the screen pipe, said last mentioned means being retractable with said said pipe into said imperforate pipe, and a valved branch opening from said imperforate pipe into said caisson to provide direct communication between the caisson and screen pipe when the said means is retracted into the imperforate pipe.

3. In combination, a caisson, a screen pipe extending radially outwardly through the caisson wall into a water bearing stratum and sealed to the caisson wall, a valve on the inner end of said pipe, an imperforate pipe of about the same diameter as said screen pipe mounted on the face of said valve and extending into said caisson, a sand pipe extending axially into said imperforate and screen pipes and sealed to the imperforate pipe at the end thereof opposite its connection with said valve, an apertured sleeve on the end of said sand pipe, sealing means at opposite ends of said sleeve adapted for slidably sealingly engaging the inside of said screen pipe, said sleeve and seals being adapted for retraction into said imperforate pipe, and means on said imperforate pipe for flushing said screen pipe when said sleeve is so retracted.

4. In combination, in a water collector of the nature described; a vertical caisson, a screen pipe projecting radially outwardly through the caisson wall into the surrounding earth, a sand pipe extending axially within said screen pipe and reciprocable therein, an apertured sleeve on the end of the sand pipe within the screen pipe, means slidably sealing between opposite ends of the sleeve and the screen pipe, and means within said caisson communicating with the entire length of said screen pipe when said sleeve is retracted into said caisson to a position inwardly of said communicating means for flushing said screen pipe.

5. In the method of operating a water collector of the nature described, the step of sinking a vertical caisson into the earth, forcing a screen pipe radially outwardly through the wall of the caisson into the surrounding earth, inserting a sand pipe with spaced sealing means on the end thereof into said screen pipe to sealingly engage the inside of said screen pipe at spaced points therealong, forcing liquid under pressure outwardly through the screen pipe between the said spaced points therealong into the surrounding earth to dislodge sand and fines therefrom, withdrawing the spaced sealing means into the caisson to a position spaced inwardly from said caisson wall, admitting liquid into the screen pipe outwardly of the caisson sealing means, and withdrawing the liquid into the caisson ahead of the sealing means to flush the screen pipe.

References Cited in the file of this patent

UNITED STATES PATENTS

| | | |
|---|---|---|
| 848,501 | Scofield | Mar. 26, 1907 |
| 1,230,007 | Milliken | June 12, 1917 |
| 1,808,958 | Lane et al. | June 9, 1931 |
| 2,126,575 | Ranney | Aug. 9, 1938 |
| 2,126,576 | Ranney | Aug. 9, 1938 |
| 2,214,121 | Costello | Sept. 10, 1940 |
| 2,383,496 | Nebolsine | Aug. 28, 1945 |